(12) United States Patent
Miasnik et al.

(10) Patent No.: US 8,937,548 B1
(45) Date of Patent: *Jan. 20, 2015

(54) EVALUATING TARGETING QUALITY RATINGS AND PREDICTING POTENTIAL REACH OF ALERTS IN A MASS NOTIFICATION SYSTEM

(71) Applicant: AtHoc, Inc., San Mateo, CA (US)

(72) Inventors: Guy Miasnik, Mountain View, CA (US); Aviv Siegel, San Mateo, CA (US)

(73) Assignee: AtHoc, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,202

(22) Filed: Aug. 23, 2013

Related U.S. Application Data

(63) Continuation of application No. 13/027,602, filed on Feb. 15, 2011, now Pat. No. 8,542,117.

(60) Provisional application No. 61/305,678, filed on Feb. 18, 2010.

(51) Int. Cl.
*G08B 21/00* (2006.01)
*G08B 23/00* (2006.01)

(52) U.S. Cl.
CPC ...................................... *G08B 23/00* (2013.01)
USPC .......................... 340/540; 370/232; 455/404.1

(58) Field of Classification Search
USPC .......... 340/540; 370/230, 232, 252; 455/11.1, 455/41.3, 91, 404.1, 404.2, 423, 561; 725/19

See application file for complete search history.

(56) References Cited

U.S. PATENT DOCUMENTS

| | | | |
|---|---|---|---|
| 6,385,444 B1 | 5/2002 | Peschel et al. | |
| 7,085,230 B2 | 8/2006 | Hardy | |
| 7,366,461 B1 | 4/2008 | Brown | |
| 7,706,291 B2 | 4/2010 | Luft et al. | |
| 8,140,113 B2 | 3/2012 | Rofougaran | |
| 8,208,891 B2 | 6/2012 | Jacobs et al. | |
| 8,380,874 B2 | 2/2013 | Katis et al. | |
| 8,542,117 B1* | 9/2013 | Miasnik et al. ............... | 340/540 |
| 2004/0204035 A1 | 10/2004 | Raghuram et al. | |
| 2009/0103433 A1 | 4/2009 | Katis et al. | |
| 2009/0111462 A1 | 4/2009 | Krinsky et al. | |
| 2009/0168759 A1 | 7/2009 | Katis et al. | |
| 2013/0028114 A1 | 1/2013 | Gutierrez et al. | |

* cited by examiner

*Primary Examiner* — John A Tweel, Jr.
(74) *Attorney, Agent, or Firm* — Fenwick & West LLP

(57) ABSTRACT

A system and a method are disclosed for predicting potential reach of an alert to a targeted audience, targeted personal delivery devices and targeted non-personal notification delivery devices in an emergency mass notification system. The method includes receiving audience data which defines at least one of a set of users and a set of devices. The method further comprises evaluating a contact, tracking, or real-time targeting quality rating based on the received audience data and a data sources repository. Based on the evaluation, a prediction of the potential reach of the alert is generated and outputted.

22 Claims, 8 Drawing Sheets

EVALUATING TARGETING QUALITY RATINGS AND PREDICTING POTENTIAL REACH OF ALERTS IN A MASS NOTIFICATION SYSTEM

CROSS-REFERENCE TO RELATED APPLICATIONS

This application is a continuation of U.S. application Ser. No. 13/027,602, filed Feb. 15, 2011, now U.S. Pat. No. 8,542,117, which claims priority under 35 U.S.C. §119(e) to U.S. Provisional Patent Application No. 61/305,678, filed on Feb. 18, 2010, entitled "PREDICTIVE ALERT TARGETING FOR MASS NOTIFICATION SYSTEMS" both of which are incorporated by reference in their entirety.

BACKGROUND

1. Field of Art

The disclosure generally relates to the field of emergency mass notification systems, more particularly, to predicting the potential reach of an alert to its targeted recipients and devices within an emergency mass notification system.

2. Description of the Related Art

Organizations face many threats which may affect their operation and safety and security of their facilities and personnel. There is a growth of use of Emergency Mass Notification Systems (EMNS) by many organizations and on different levels, e.g., from national, state, local to corporate and organization levels. Emergency Mass Notification Systems allow authorized personnel and external systems to trigger alerts that are sent to targeted recipients via a variety of personal communication devices, including electronic mail (email), short messaging system (SMS), voice phone alerts, desktop pop-ups and others. Emergency Mass Notification Systems may also use non-personal notification devices, such as indoor speakers, outdoor speakers, reader boards, digital displays, Land Mobile Radios (LMRs), AM/FM Radios, TV broadcast, strobes, fire alarms and others. Emergency Mass Notification Systems allow one to maintain a repository of users, along with personal attributes (i.e. location, role, organizational unit, training level etc.) and the contact details of their personal communication devices, and to build a dynamic targeted recipient list for use while sending a specific emergency notification.

Targeted recipient list can be built by any combination of the following: pre-defined distribution lists, dynamic lists, geographical/physical location, organizational units, dynamic database query or other methods; or by selecting a pre-defined scenario (i.e., "policy") that includes pre-selection of such targeted recipient list that may or may not be modified before activating the alert. Emergency Mass Notification Systems usually include a list of non-personal notification devices to be targeted and activated, including sirens, speakers, digital displays, strobes, fire alarms and others. Similarly, targeted non-personal notification devices may include any combination of pre-defined distribution lists, dynamic lists, geographical/physical location, dynamic database query or other methods; or by selecting a pre-defined scenario that includes pre-selection of such targeted non-personal notification devices that may or may not be modified before activating the alert.

One challenge faced by conventional Emergency Mass Notification Systems is that regardless of the method used to select the targeted recipient list, an alert initiator (administrator or external system) has little or no idea during alert activation what is the potential reach of the alert across a targeted audience or targeted devices. For example, some Emergency Mass Notification Systems show the number of targeted recipients or a list of targeted recipients or devices, but no indication whether that these targeted recipients and/or devices can be reached at all because contact details for the recipients may be missing or invalid, or may not be up-to-date. Some conventional Emergency Mass Notification Systems provide detailed delivery and response tracking and aggregated results reporting, yet this information is provided after the notification has been activated, and does not provide any pre-activation indication of the potential reach of the notification.

This difficulty leads to ineffective alerting, where an alert sender cannot know what the potential reach of the alert is, and may lose time during an emergency situation trying to alert recipients or non-personal notification devices with missing contact details, invalid or stale contact details, disconnected non-personal notification devices or invalid non-personal notification devices data. Thus, there is lacking, inter alia, a system and method for predicting the potential reach of an alert to its targeted recipients and devices via a given set of designated delivery methods within an emergency mass notification system.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes receiving targeted recipients and designated alert delivery devices (personal communication devices and non-personal notification devices) and evaluating one or more targeting quality ratings of the targeted recipients and devices data. The targeted recipients and designated alert delivery devices data define a targeted audience of an alert, comprising of targeted users, targeted personal communication devices and/or targeted non-personal notification devices. Evaluating the targeting quality ratings includes evaluating contact and device configuration data targeting quality rating based on the targeted recipients and devices data and a user/device information database. Evaluating the targeting quality ratings also includes evaluating tracking data targeting quality rating based on the received recipients and devices data and an alert delivery events information database. Evaluating the targeting quality ratings further includes evaluating real-time data targeting quality rating based on the received recipients and devices data and a real-time data database. Responsive to the targeting quality ratings and prediction weighting data (e.g., numeric weights and descriptive thresholds), the method generating one or more predictions of the potential reach of the alert based on the targeting quality ratings.

Computing Machine Architecture

Figure 1:
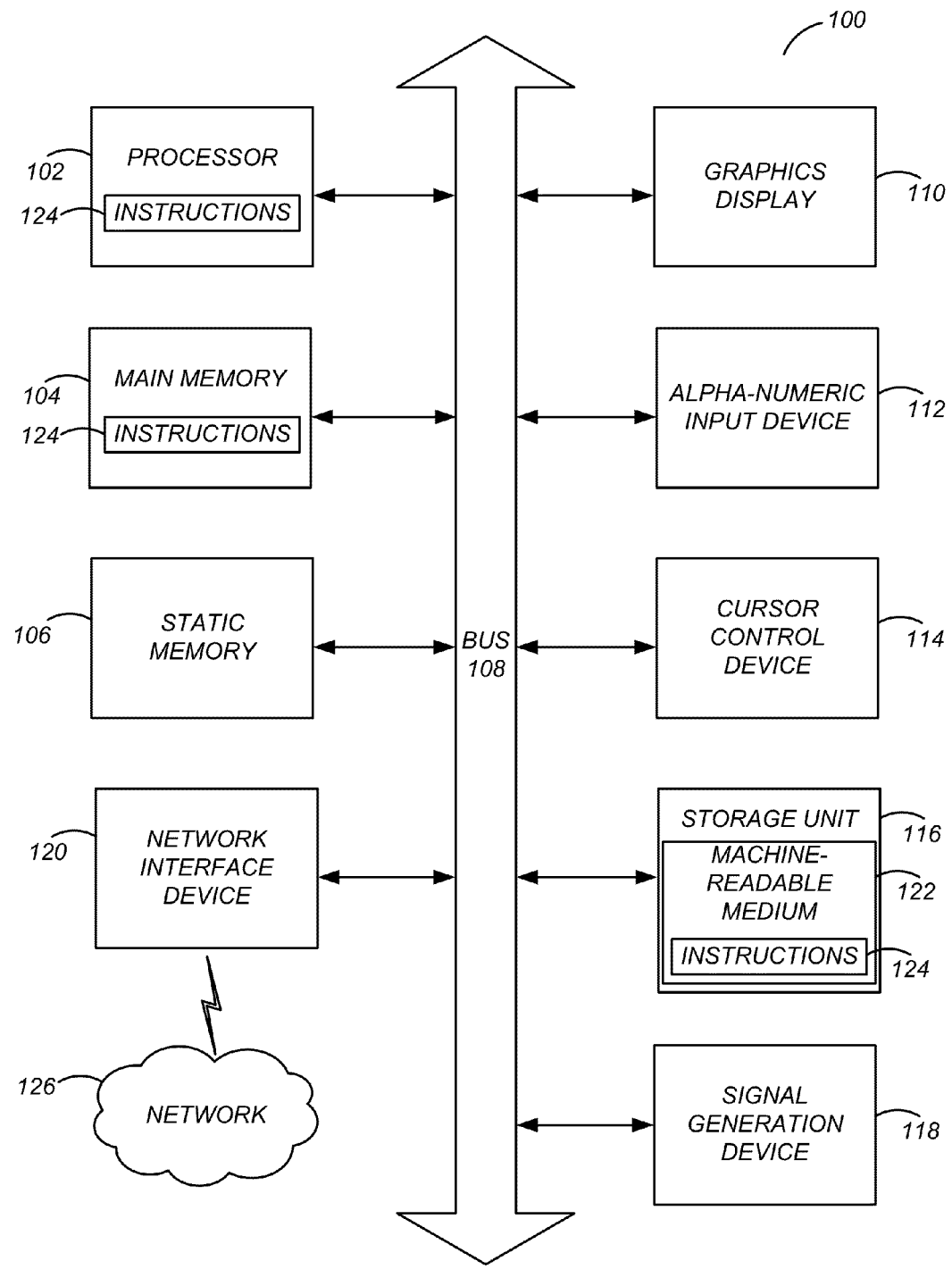
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Architectural Overview

Figure 2:
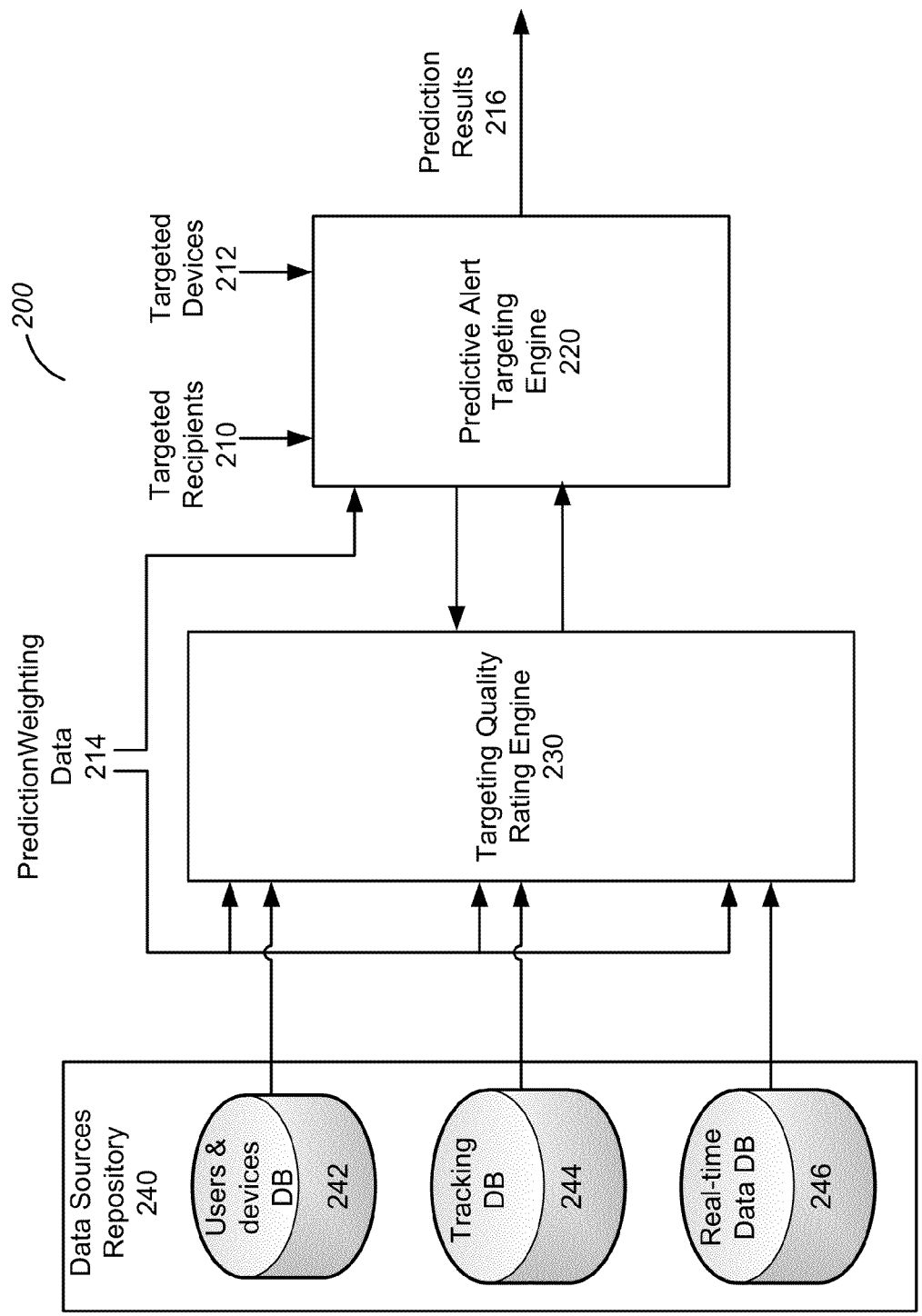
FIG. 2 illustrates a system architectural overview of a predictive alert targeting system according to one embodiment.

Referring now to FIG. 2, illustrated is a system architectural overview of a predictive alert targeting system 200. The system 200 comprises a predictive alert targeting engine 220, a targeting quality rating engine 230, and a data sources repository 240, which can be based on a commercial database, for example, MICROSOFT SQL Server, ORACLE database server, MySQL or other similar products. The system 200 receives targeted recipients/users 210 and targeted devices (personal communication devices and non-personal notification devices) 212 from system administrators or received from external systems via Application Programming Interfaces (APIs). The targeted recipients 210 and targeted devices 212 identify a targeted audience and devices for emergency alerts. The predictive alert targeting engine 220 sends the targeted users 210 and/or devices 212 to the targeting quality rating engine 230. The targeting quality rating engine 230 evaluates targeting quality ratings of the targeted users 210 and the devices 212 against the data sources repository 240, and reports the targeting quality ratings to the predictive alert targeting engine 220 for further processing. The predictive alert targeting engine 220 predicts the potential reach of an alert to its targeted recipients and/or devices based on the targeting quality ratings weighted by predictive weighting data 214. The predictive alert targeting engine 220 further reports the prediction results 216. The targeting quality rating engine 230 is further described with reference to FIGS. 4-7, and the predictive alerter targeting engine 220 is further described with reference to FIG. 8.

The data sources repository 240 comprises a user and devices information database 242, a tracking database 244 of historical alert delivery events and a real-time data database 246. The user and devices information database 242 is a database repository of users along with user attributes (such as role, location, organizational hierarchy, and others), and the user contact data for their personal communication devices (such as phone numbers, SMS addresses, email addresses, Lightweight Directory Access Protocol (LDAP)/Active Directory identities, Internet Protocol (IP) addresses). The data set can include timestamps of last update of the contact details and identity of the personnel who made the update. For example, the update is self-updated by a user, self-updated by end user device, imported from an external user database, or updated by another user or system. The user and devices information database 242 may also include information of non-personal notification devices, their identities and connection attributes (e.g., siren pole numbers or unique device identity, locations, zones and IP addresses).

The tracking database 244 of the data sources repository 240 includes historical tracking of alert delivery events. The historical tracking of an alert delivery event includes a timestamp of the event, user or non-personal notification device identity, actual device address/identity used for the alert delivery and information about the alert delivery event. The information about the alert delivery event may include message sent, message received, message rejected, message acknowledged (and the response, if applicable) by a user or an end point.

The real-time data database 246 includes current or up-to-date information about users and non-personal devices end points. The information may include the location, presence and connectivity of the users and delivery end points, such as user presence status as indicated by presence aware systems (such as instant messaging systems), user current location (as may be reported by mobile devices or Global Position System (GPS)), and connectivity status to a siren pole or a public address system. Real-time data also includes timestamp for a data item in the real-time data database 246.

The predictive alert targeting system 200 predicts the potential reach of an alert to its targeted recipients and/or devices. The targeted recipients 210 and targeted devices 212 identify a targeted audience and devices for an emergency alert. The targeted recipients data 210 and targeted device 212 are provided by system administrators or received from external systems via APIs. The targeted recipients 210 identify a designated set of users or non-personal notification devices delivery end points. The targeted devices 212 identify a designated set of alert personal communication devices associated with the targeted users or the non-personal notification devices delivery end points. The designated set of alert personal communication devices can also be derived from personal delivery preferences associated with the end users.

The prediction weighting data 214 includes quantitative and/or qualitative measures, such as numeric values as weights or descriptive thresholds, to influence the targeting quality rating process and the prediction of the potential reach of an alert. In one embodiment, the prediction weighting data 214 is a set of numeric weight values indicating a range of weights to be assigned to a targeted user and/or delivery device. For example, for a targeted user not having a phone number, the prediction weighting data 214 is 1. On the other hand, for a targeted user having two or phone numbers, the prediction weighting data 214 is higher (e.g., 5 ranging from 1 to 5). Similarly, in another embodiment, the prediction weighting data 214 is a set of descriptive levels describing the characteristics of the targeted user and/or delivery device. For example, for a more recent successful alert delivery event to a targeted user, the prediction weighting data 214 is "very high." For an alert delivery event delivered 1 year ago to the targeted user, the prediction weighting data 214 is "very low." Other embodiments may use the combination of numeric values and descriptive levels as the prediction weighting data 214 or other weighting schemes known to those of ordinary skills in the art. The predictive alert targeting system 200 has a default set of prediction weighting data 214, and the system 200 allows system administrators and/or end users and/or APIs to reset and/or reconfigure the prediction weighting data 214 (e.g., to give more weight to recently updated data).

Figure 3:
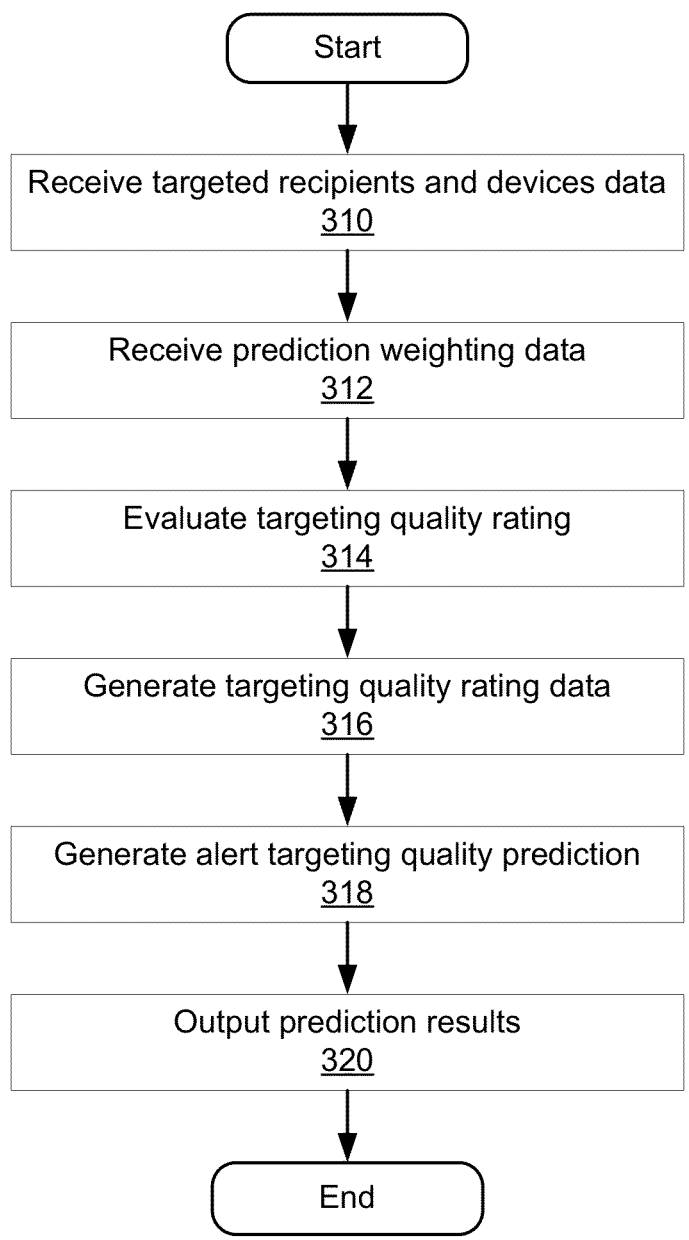
FIG. 3 is a flow chart of generating alert targeting quality prediction according to one embodiment.

Referring now to FIG. 3, FIG. 3 is a flow chart of generating alert targeting quality prediction by the predictive alert targeting system 200 according to one embodiment. Other embodiments perform different and/or additional steps than the ones described here. Moreover, other embodiments perform the steps in different orders. A typical embodiment of the predictive alert targeting system 200 processes multiple alerts potential reach predictions concurrently. Thus, the predictive alert targeting system 200 simultaneously performs multiple instances of the steps described here.

Initially, the predictive alert targeting engine 220 receives 310 targeted recipients and devices data from a system administrator or received from external systems via APIs. The predictive alert targeting engine 220 may further receive 312 prediction weighting data for targeting quality rating evaluation and prediction of potential reach of an alert. The targeting quality rating engine 230 of the system 200 receives the targeted recipients and/or devices data from the predictive alert targeting engine 200. The targeting quality rating engine 230 evaluates 314 the targeting quality ratings of the received data against the data sources repository 240, and generates 316 targeting quality rating data for the targeted recipients and devices. The targeting quality rating engine 230 sends the targeting quality rating data to the predictive alert targeting engine 220 for further processing. The predictive alert targeting engine 220 generates 318 the prediction of potential reach of the alert based on the targeting quality rating data and the prediction weighting data. The predictive alert targeting engine 220 furthers outputs 320 the prediction results to the system 200. The output may be presented in a user interface (UI) to an administrator, to a user or to an external system via API. The administrator or the external system may choose to update the targeted recipients and/or devices and run through the predictive alert targeting engine 220 again to assess how the changes had changed the prediction results.

Targeting Quality Rating Engines

Figure 4:
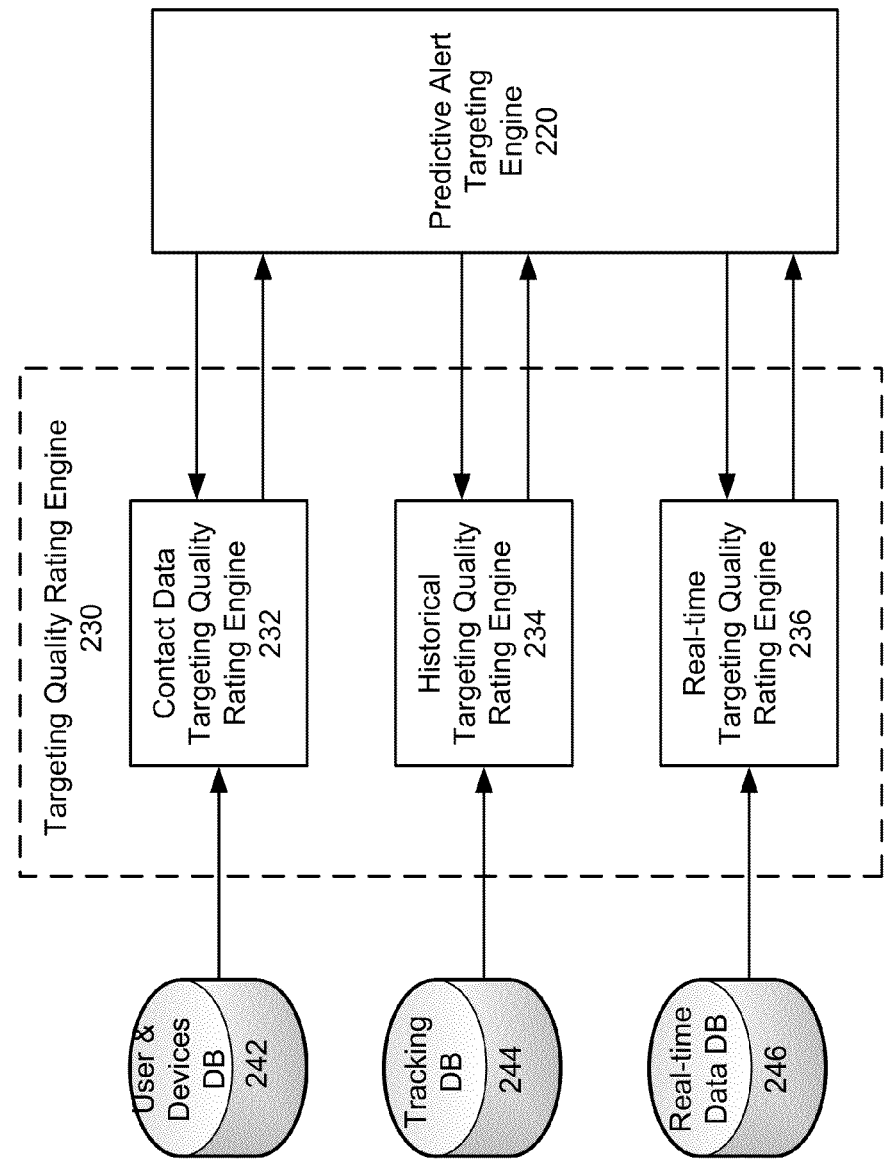
FIG. 4 illustrates one embodiment of a targeting quality rating engine of the predictive alert targeting system shown in FIG. 2.

For a targeted set of users and their alert delivery devices and/or non-personal notification devices delivery end points, the targeting quality rating engine 230 evaluates the targeting quality rating of the targeted set of users and their personal delivery devices and/or the targeting quality rating of the targeted set of non-personal notification devices. FIG. 4 illustrates one embodiment of the targeting quality rating engine 230 of the predictive alert targeting system 200. The targeting quality rating engine 230 illustrated in FIG. 4 comprises a contact data targeting quality rating engine 232, a historical targeting quality rating engine 234 and a real-time targeting quality rating engine 236. The targeting quality rating engine 230 is communicatively coupled to the databases (242, 244 and 246) of the data sources repository 240 and to the predictive alert targeting engine 220. The flow charts of evaluating the targeting quality rating of the set of users and their personal delivery devices are further described below with references to FIGS. 5-7.

The contact data targeting quality rating engine 232 is communicatively coupled to the predictive alert targeting engine 220 and to the user and device information database 242 of the data sources repository 240. The engine 232 receives the targeted recipients, their alert delivery devices and/or targeted non-personal notification devices from the predictive alert targeting engine 220. The engine 232 may further receive prediction weighting data 214 from the predictive alert targeting engine 220 or directly from the system 200. The engine 232 searches the user and device database 242 based on the received recipients and delivery devices to collect relevant user/device data. The engine 232 evaluates the retrieved data based on the prediction weighting data 214 to generate one or more targeting quality ratings (TQRs) of the received recipients, personal delivery devices and/or non-personal notification devices. A possible flow chart of evaluating the targeting quality rating of the set of users and their personal delivery devices by the engine 232 is further described below with reference to FIG. 5.

In one embodiment, the engine 232 runs a targeting quality rating algorithm to generate the TQRs. For a recipient and his/her alert delivery device(s), the evaluation algorithm considers data availability, data validity and data update quality of the relevant data retrieved from the user and device database 242. For example, a user may not have a phone number, which results in a low TQR. The engine 232 further evaluates the validity of the relevant data. For example, a phone number can be incomplete or invalid, which results in a low TQR. The engine 232 uses the prediction weighting data 214 to adjust the valid data retrieved from the user and device database 242. For example, a valid user data may get a higher rating if it was updated recently by the user or by its device comparing with a user data which has not been updated or validated for some period of time.

The engine 232 generates one or more TQRs for the received recipient and his/her delivery devices. For example, the engine 232 generates a TQR for each user/device combination (e.g., user email address, user phone number, or siren pole identity). In another embodiment, the engine 232 generates a TQR for each end user, their personal communication devices and for each non-personal notification device end node. The engine 232 sends the TQRs to the predictive targeting engine 220 for further processing.

The historical targeting quality rating engine 234 is communicatively coupled to the predictive alert targeting engine 220 and to the tracking database 244 of the data sources repository 240. The engine 234 receives the targeted recipients, their alert delivery devices and/or the targeted non-personal notification devices from the predictive alert targeting engine 220. The engine 234 may further receive prediction weighting data 214 from the predictive alert targeting engine 220 or directly from the system 200. The engine 234 searches the tracking database 244 based on the received recipients and delivery devices to collect relevant user/device data. The engine 234 evaluates the retrieved data based on the prediction weighting data 214 to generate one or more TQRs of the received recipients and delivery devices. A possible flow chart of evaluating the targeting quality rating of the set of users and their personal delivery devices by the engine 234 is further described below with reference to FIG. 6.

In one embodiment, the engine 234 runs a targeting quality rating algorithm to generate the TQR. For a recipient and his/her alert delivery device(s), the evaluation algorithm considers data availability, consistency of alerts delivery and data update quality of the relevant data retrieved from the tracking database 244. For example, a user/personal communication device combination which has no delivery event gets a low TQR rating, while a responded delivery event may get a higher TQR, depending on the type of delivery event (e.g., positive no error delivery events). The freshness of data may also affect rating, where recent alert delivery events (e.g., in the last 30 days) gets a higher rating than older events (e.g., a year ago). In a similar manner, an end-user/device combination which consistently and successfully responded in the last period of time gets higher rating than those which did not respond in a consistent manner (e.g., failed 10 times and succeeded once in the last 10 days).

The engine 234 generates one or more TQRs for the received recipient and his/her delivery devices. For example, the engine 234 generates a TQR for each user/device combination (e.g., user email address, user phone number, or siren pole identity). In another embodiment, the engine 234 generates a TQR for each end user, their personal communication devices and for each non-personal device end node. The engine 234 sends the TQRs to the predictive targeting engine 220 for further processing.

The real-time targeting quality rating engine 236 is communicatively coupled to the predictive alert targeting engine 220 and to the real-time data database 246 of the data sources repository 240. The engine 236 receives the targeted recipients, their personal communication devices and targeted non-personal notification devices from the predictive alert targeting engine 220. The engine 236 may further receive prediction weighting data 214 from the predictive alert targeting engine 220 or directly from the system 200. The engine 236 searches the real-time data database 246 based on the received recipients and delivery devices to collect relevant user/device data. The engine 236 evaluates the retrieved data based on the prediction weighting data 214 to generate one or more TQRs of the received recipients and delivery devices. A possible flow chart of evaluating the targeting quality rating of the set of users and their personal delivery devices by the engine 236 is further described below with reference to FIG. 7.

In one embodiment, the engine 236 runs a targeting quality rating algorithm to generate the TQRs. For a recipient, his/her alert delivery device(s) and for non-personal notification devices, the evaluation algorithm considers current status and data update quality of the relevant data retrieved from real-time data database 246. For example, a user/alert delivery device may include presence information which indicates that the user is online and is available for instant messaging. The user/alert delivery device may also include connectivity status of a siren pole or digital display, indicating it is ready to receive a new alert message activation. The update quality may affect rating as well, where more recent update (e.g., last minute) gets a higher rating than the data from five minutes ago.

The engine 236 generates one or more TQRs for the received recipient and his/her delivery devices, and for non-personal notification devices. For example, the engine 236 generates a TQR for each user/device combination (e.g., user email address, user phone number, or siren pole identity). In another embodiment, the engine 236 generates a TQR for each end user, their personal communication devices and for each non-personal notification device end node. The engine 236 sends the TQRs to the predictive targeting engine 220 for further processing.

Figure 5:
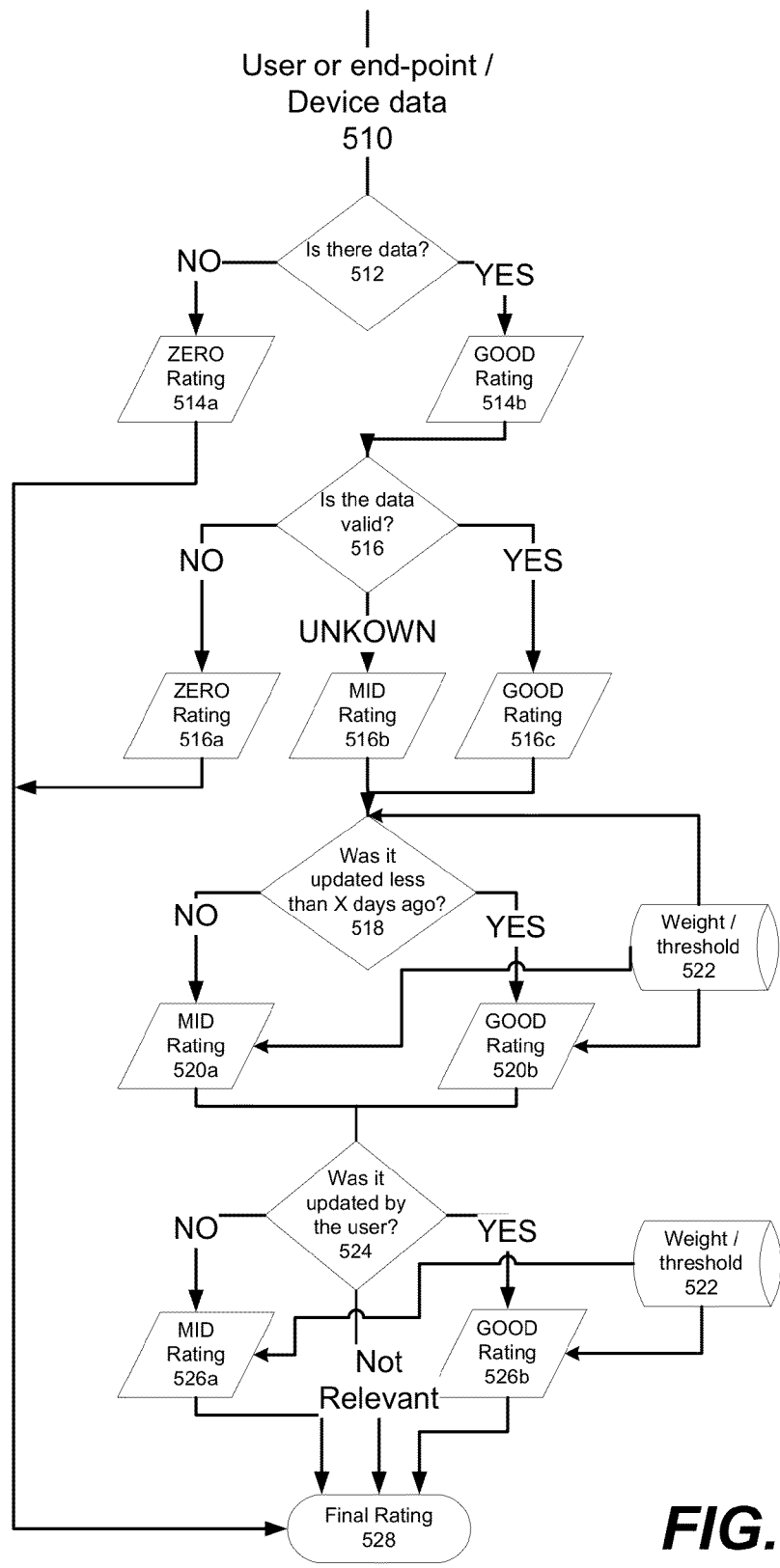
FIG. 5 is a flow chart of evaluating the targeting quality rating of contact data by a contact data targeting quality rating engine according to one embodiment.

Referring now to FIG. 5, FIG. 5 is a flow chart of evaluating the targeting quality rating of contact data by the data targeting quality rating engine 232 according to one embodiment. Initially, the engine 232 receives 510 targeted users, their personal communication devices and targeted non-personal notification devices as its input data from the predictive alert targeting engine 220. The input data indentifies the targeted audiences and the alert delivery devices to be evaluated by the engine 232. The engine 232 evaluates 512 whether there are relevant data (e.g., phone number, siren identity) from the user and device database 242. Responsive to absence of any relevant data in the user and device database 242, the engine 232 assigns 514a a zero rating (e.g., "ZERO") to the input data. Responsive to existence of some relevant data in the user and device database 242, the engine 232 assigns 514b a high (i.e., "GOOD") rating to the input data, and further evaluates the relevant data retrieved from the user and device database 242.

The engine 232 first evaluates 516 whether the retrieved data is valid. Responsive to the retrieved data being not valid (i.e., knowing that the retrieved data is not good), the engine assigns 516a a zero rating to the input data. Responsive to the retrieved data being unknown (i.e., not knowing whether the retrieved data is good), the engine 232 assigns 516b a medium rating (e.g., "MID") to the input data. For valid or unknown data retrieved from the user database 242, the engine 232 further checks 518 whether the retrieved data was updated less than a predefined period of time (e.g., 10 days ago). In one embodiment, the engine 232 guides its evaluation by the prediction weighting data (e.g., weight/threshold 522). Responsive to the retrieved data not being updated less than the predefined period of time, the engine 232 assigns 520a a medium rating to the input data. The engine 232 assigns 520b a good rating to the input data in response to the retrieved data being updated. The engine 232 further investigates 524 the source of the update. Responsive to the data being updated by the user who is same as one of the targeted recipients, the engine 232 assigns 526b a good rating to the input data. Otherwise, the engine 232 assigns 526a a medium rating to the input data. The update method 524 may also be not relevant, for example, in case of non-personal notification device, in which case no rating is given. The engine 232 may use the weight/threshold data 522 to weigh its evaluation. The engine 232 generates 528 final rating from the ratings generated at different evaluation stages.

Figure 6:
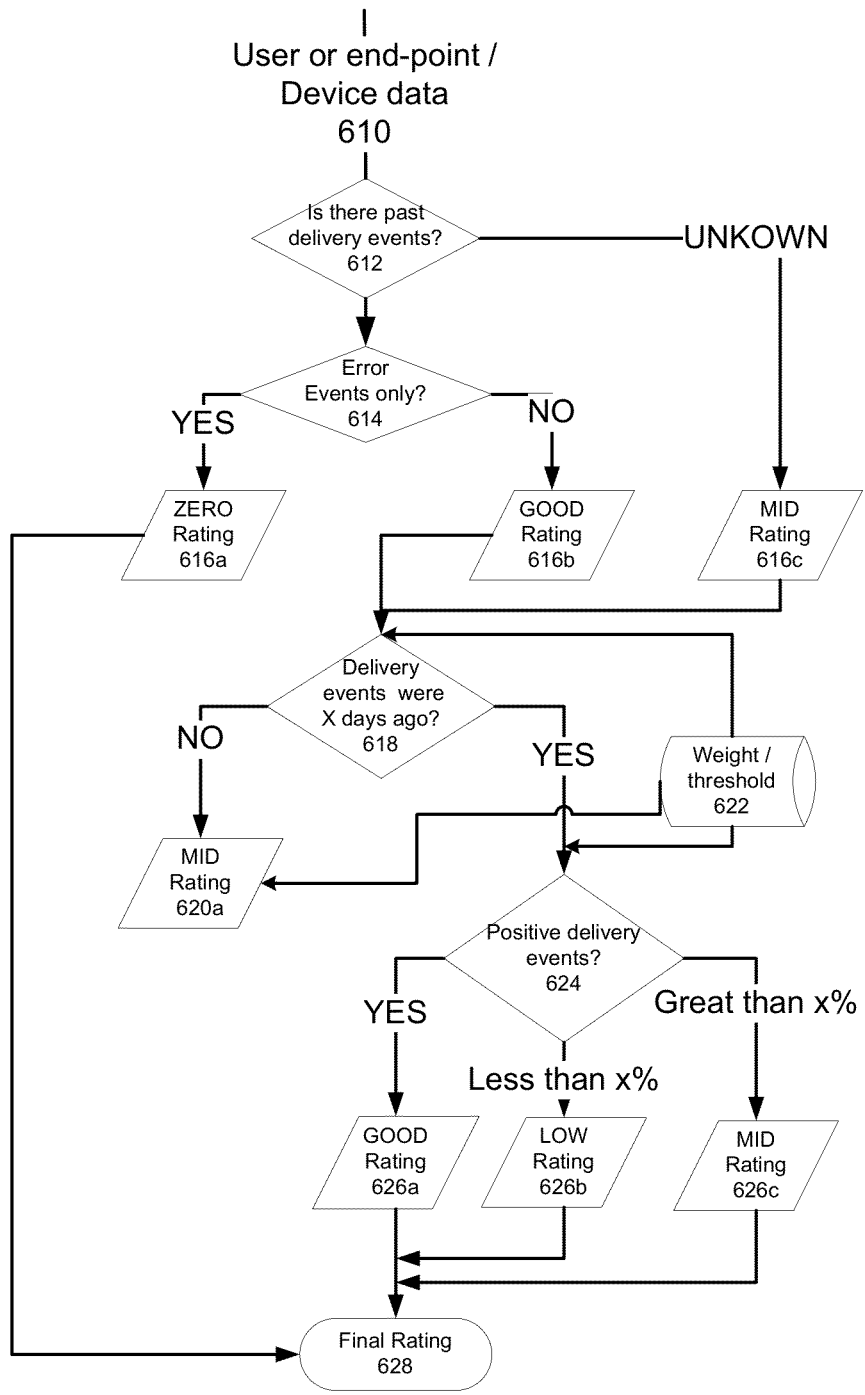
FIG. 6 is a flow chart of evaluating the targeting quality rating of historical tracking data by a historical targeting quality rating engine according to one embodiment.

FIG. 6 is a flow chart of evaluating the targeting quality rating of historical tracking data by the historical targeting quality rating engine 234 according to one embodiment. Initially, the engine 234 receives 610 targeted users, their personal communication devices and targeted non-personal notification devices as its input data from the predictive alert targeting engine 220. The input data indentifies the targeted audiences and the alert delivery devices to be evaluated by the engine 234. The engine 234 evaluates 612 whether there are any past alert delivery events from the tracking database 244. Responsive to the retrieved delivery events from the tracking database 244 being unknown, the engine 234 assigns 616c a medium rating to the input data. Otherwise, the engine 243 checks 614 whether the retrieved delivery events are error events (e.g., alert delivery events failing to reach their audiences). Responsive to the delivery events failing to reach their targeted audiences, the engine 234 assigns 616a a zero rating to the input data. The engine 234 assigns 616b a good (i.e., "GOOD") rating to the input data responsive to the delivery events reaching their audiences successfully.

The engine 234 further evaluates 618 the data update quality of the delivery events retrieved from the tracking database 244. The engine 234 first evaluates 618 whether the delivery events were updated less than a predefined period of time (e.g., 10 days ago). In one embodiment, the engine 234 guides its evaluation by the prediction weighting data (e.g., weight/threshold 622). Responsive to the retrieved data not being updated less than the predefined period of time, the engine 234 assigns 620a a medium rating to the input data. In response to the delivery events being updated less than the predefined period of time, the engine 234 investigates 624 the consistency of alter delivery. Responsive to the alter delivery events being positive delivery, the engine 234 assigns 626a a good rating to the input data. A positive delivery indicates that the alerts successfully reached their targeted audiences. Responsive to the delivery events reaching than a predefined percentage of delivery attempts (e.g., 40%), the engine 234 assigns 626b a low rating to the input data. Otherwise, the engine 234 assigns 626c a medium rating to the input data. The engine 234 generates 628 final rating from the ratings generated at different evaluation stages.

Figure 7:
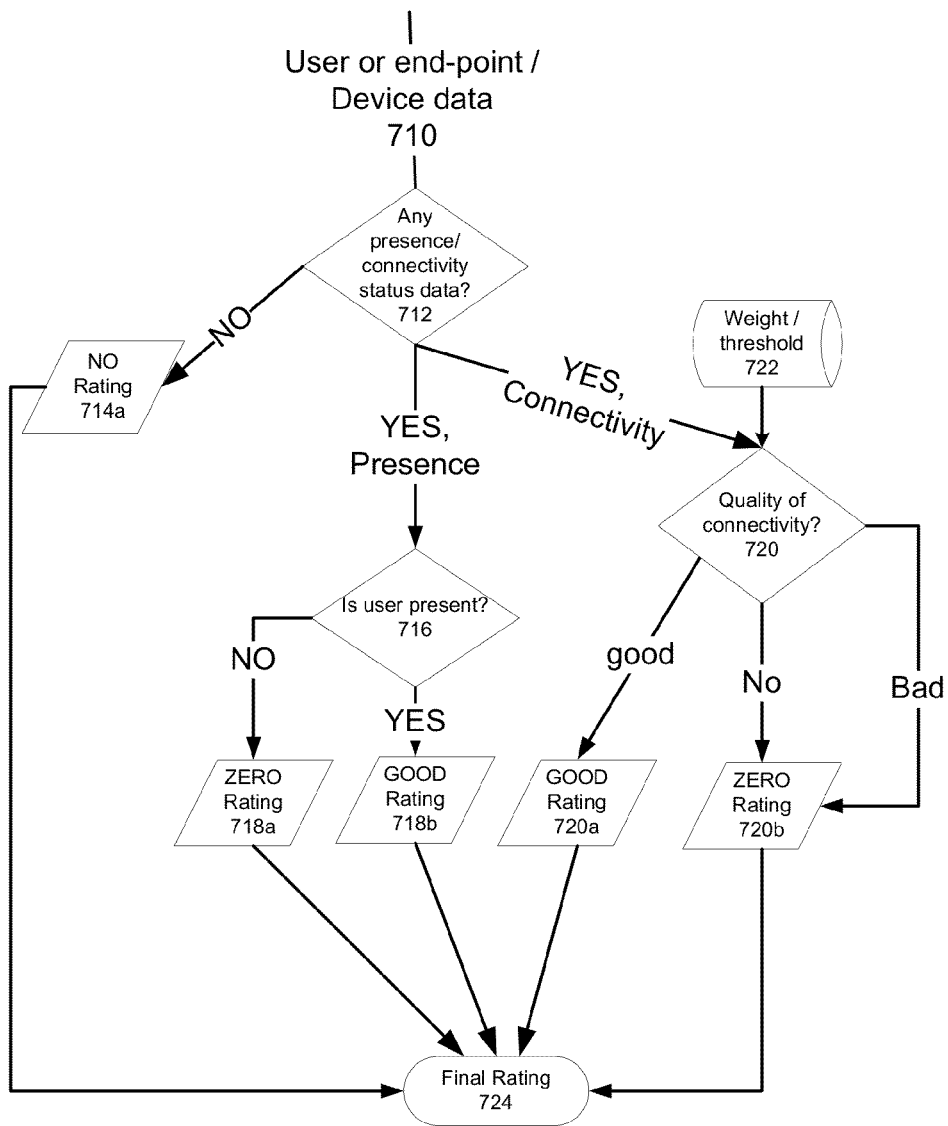
FIG. 7 is a flow chart of evaluating the targeting quality rating of real-time data by a real-time targeting quality rating engine according to one embodiment.

FIG. 7 is a flow chart of evaluating the targeting quality rating of real-time data by a real-time targeting quality rating engine 246 according to one embodiment. Initially, the engine 236 receives 710 targeted users, their personal communication devices and targeted non-personal notification devices as its input data from the predictive alert targeting engine 220. The input data indentifies the targeted audiences and their alert delivery devices to be evaluated by the engine 236. The engine 236 evaluates 712 whether there is user presence and/or delivery device status data from the real-time data database 246. Responsive to absence of any relevant data in the real-time data database 246, the engine 236 assigns 714a a 'NO' rating to the input data (as presence or connectivity is unknown for this type of delivery device). Responsive to existence of relevant data in the real-time data database 246, the engine 236 further evaluates 716 whether the user identified in the input data is present. The engine 236 assigns 718a a zero rating to the input data in response to the identified user being not present. Otherwise, the engine 236 assigns 718b a good rating to the input data.

Responsive to existence of relevant data in the real-time data database 246, the engine 236 further investigates 720 the quality of connectivity of a delivery device identified by the input data based on the weight/threshold data 722. In one embodiment, the engine 236 guides its evaluation by the prediction weighting data (e.g., weight/threshold 722). Responsive to the connectivity being good, the engine 236 assigns 720a a good rating to the input data. The engine 236 assigns 720b a zero rating to the input data in response to no connectivity or the connectivity being bad. The engine 236 generates 724 final rating from the ratings generated at different evaluation stages.

Predictive Alert Targeting Engine

Figure 8:
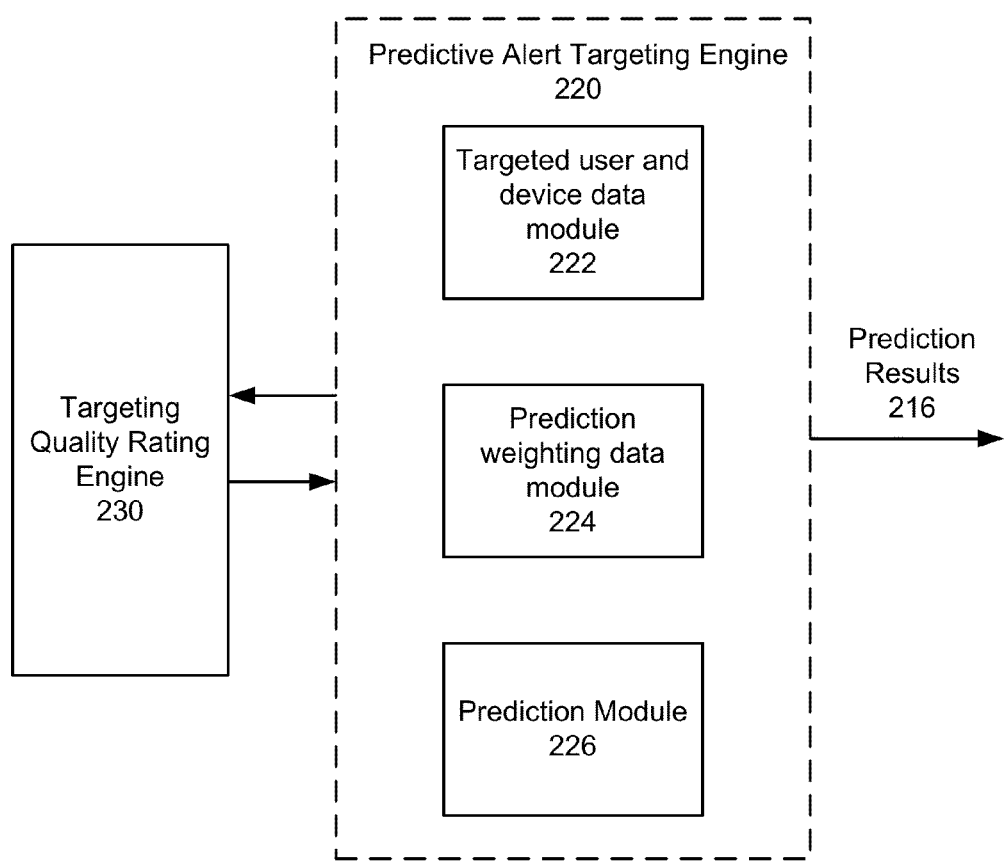
FIG. 8 illustrates one embodiment of a predictive alert targeting engine of the predictive alert targeting system.

Referring now to FIG. 8, FIG. 8 illustrates one embodiment of a predictive alert targeting engine 220 of the predictive alert targeting system 200. The predictive alert targeting engine 220 communicates with the targeting quality rating engine 230 and predicts the potential reach of an alert to its targeted audiences based on the TQRs from the engine 230. The predictive alert targeting engine 220 illustrated in FIG. 8 comprises a targeted user and device data module 222, a prediction weighting data module 224 and a prediction module 226.

The targeted user data module 222 receives the targeted recipients 210 and the targeted devices 212 from system administrators or received from external systems. The targeted recipients 210 and devices (personal and non-personal) 212 identify a targeted audience for emergency alerts. For example, the targeted user data module 222 receives a set of users with designated personal delivery devices as its targeted recipients 210 and devices 212. Alternatively, the targeted recipients 210 and devices 212 may represent a set of sirens and digital displays to activate. In one embodiment, the targeted user and device data module 222 sends the targeted recipients 210 to the targeting quality engine 230 for further processing. In another embodiment, the targeted user and device data module 222 sends the targeted devices 212 to the targeting quality engine 230 for further processing. In other embodiments, the targeted user and device data module 222 sends both the targeted recipients 210 and devices 212 to the targeting quality engine 230 for further processing.

The prediction weighting data module 224 receives prediction weighting data, such as numeric weights value or descriptive thresholds, from end users, system administrators or received from external systems. In one embodiment, the prediction weighting data module 224 sets default values of the prediction weighting data by the system administrators. In another embodiment, the prediction weighting data module 224 allows an end user to modify the default values of the prediction weighting data. In yet another embodiment, the prediction weighting data module 224 receives updates from external system via API to modify the default values of the prediction weighting data. The prediction weighting data module 224 sends the received prediction weighting data to the targeting quality rating engine 230 for its rating evaluation. The prediction weighting data module 224 also sends the received prediction weighting data to the prediction module 226 to guide the prediction.

The prediction module 226 receives one or more targeting quality ratings from the targeting quality rating engine 230 and generates multiple predictions of the potential reach of an alert to its targeted audiences based on the targeting quality ratings. In one embodiment, the prediction module 226 provides an alert targeting quality prediction for each end user or non-personal notification device end point received by the target user data module 222. The prediction for an end user/ non-personal notification device end point gives an estimation of whether this end user/non-personal notification device end point can be reached via the designated delivery devices associated with the end user/non-personal notification device end point. For example, an end user that has successfully responded in the last time period using the designated delivery devices is regarded as "reachable." An end user which has not responded via any of the delivery devices, but has valid delivery device addresses that were self-updated in the last time period has a higher targeting quality prediction than an end user with no relevant data or no valid delivery device addresses. An end user with no relevant data or valid delivery device addresses is regarded as "not reachable." In a similar manner, a siren pole which was connected as of a minute ago, and was successfully targeted in the last week is regarded as "reachable."

In another embodiment, the prediction module 226 generates a prediction on the overall alert targeting quality based on the targeting quality ratings from the targeting quality rating engine 230. The prediction module 226 can provide percentages of reachable recipients out of the total targeted recipients with respect to the delivery devices associated with the recipients. For example, out of 170 targeted recipients, 110 are reachable, 50 are not reachable and 10 may need further investigation on their reachability. The prediction module 226 sends the prediction results 216 to the predictive alert targeting system 200. In another embodiment, the prediction module 226 can provide how many of the non-personal notification devices in a certain area have been successfully used in the last day, designating them as "reachable". For example, 17 out of 19 siren poles in a specific geographic area may be designated as reachable, and the remaining 2 siren poles may not be functional and may need further action to ensure operational status.

Usage of the predictive alert targeting engine 220 is further illustrated in the following use cases. The prediction alert targeting engine 220 can be used during alert scenario preparation to evaluate each alert scenario created by system administrators. For example, for an alert scenario to be evaluated, the system administrators input a set of end users and delivery devices data as the targeted alert audience to the predictive alert targeting engine 220. The predictive alert targeting engine 220 communicates the received targeted audience data with the targeting quality rating engine 230. The targeting quality rating engine 230 in turn evaluates the targeting quality ratings of the targeted audiences in terms of data availability, data validity, consistency of alerts delivery, user presence and device connectivity. The predictive alert targeting engine 220 generates the predictions of the potential reach of the alert and presents the predictions to the system administrators. Based on the predictions, the system administrators adjust the alert scenario and send the updates to the predictive alert targeting engine 220. The predictive alert targeting engine 220 updates the predictions by iteratively evaluating the adjustment. The predictive alert targeting system 200 stores the predictions together with the alert scenarios as baseline alert predictions for future reference.

The prediction alert targeting engine 220 can be used during alert activation. For example, for an alert being activated, the predictive alert targeting engine 220 receives a set of targeted recipients and delivery devices and communicates with the targeting quality rating engine 230. The targeting quality rating engine 230 in turn evaluates the targeting quality ratings of the targeted audiences in terms of data availability, data validity, consistency of alerts delivery, user presence and device connectivity. The predictive alert targeting engine 220 generates the predictions of the potential reach of the alert and presents the prediction to the system administrators. In one embodiment, the predictive alert targeting engine 220 may compare the current predictions with the stored baseline alert predictions (if available). If there is a significant degradation of the current predictions from the baseline alert predictions, the predictive alert targeting system 200 sends warnings to the system administrators. In a similar way, the predictive alert targeting system 200 can return warnings to application programming interfaces (APIs) used to activate alerts from external systems and sources. The external systems and sources can use the warnings to verify the targeted audience before activating the alert, and potentially update the targeted audience and devices, or initiate further action.

The prediction alert targeting engine 220 can be used during alert delivery process, where alert delivery can be prioritized based on the alert predictions from the engine 220. For example, based on the alert prediction from the engine 220, the predictive alert targeting system 200 delivers first to those end users/devices combinations which have higher targeting quality ratings to ensure successful delivery to more "reachable" end users and devices.

The prediction alert targeting engine 220 can be used for on-demand analysis of end user/end points data, where a system administrator analyzes the targeting quality (e.g., "ability to reach" or "targetability") of a designated targeted audience using personal delivery devices, or non-personal notification devices. The targeting quality assessment based on the alert targeting prediction from the engine 220 allows administrators to monitor and initiate activities to improve targeting quality, or alert dissemination tests, to ensure all targeted audience can be reached during a real emergency situation.

Similarly, the prediction alert targeting engine 220 can be used for periodic or scheduled monitoring and improvement of alert targeting prediction. For example, a monthly automated process of the engine 220 can evaluate all or designated subset of users and non-personal notification devices for their alert targeting quality prediction, and then automatically submit reminders to users who have missing, invalid data and/or stale data to update their contact details. In a similar manner, such process can notify system administrators to verify connectivity to a certain digital display or siren pole whose alert prediction quality degraded over time.

The disclosed embodiments beneficially allow for prediction of potential reach of an alert across a targeted audience in an Emergency Mass Notification System. The benefit includes enhanced emergency alert scenario preparation, iterative alert targeting prediction refinement during alert activation, alert delivery process optimization and on-demand analysis of end users personal communication devices contact data and non-personal notification device end points data. The benefit further includes periodic and scheduled alert monitoring and alert targeting prediction enhancement.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described with FIGS. 2, 4 and 8. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented, e.g., processor 102. For example, at least some of the operations of a method, e.g., as described in FIGS. 3, 5, 6 and 7, may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors, e.g., 102, may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, e.g., 102, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for predicting potential reach of an alert to a targeted audience in an emergency mass notification system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for predicting potential reach of a mass notification system, comprising:
   receiving audience data defining a targeted audience of an alert, the received audience data identifying at least one of a designated set of users and a designated set of devices;
   evaluating at least one of contact data, tracking data, and real-time data targeting quality rating based on the received audience data and one or more external databases:
   generating a prediction of the potential reach of the alert based on the evaluation; and
   outputting the prediction of the potential reach of the alert.

2. The method of claim 1, wherein evaluating the contact data targeting quality rating comprises generating at least one of targeting quality ratings of the designated set of users and the designated set of devices based on data availability, data validity, and data update quality associated with the designated set of users and designated set of devices.

3. The method of claim 1, wherein evaluating tracking data targeting quality rating comprises generating at least one of targeting quality ratings of the designated set of users and the designated set of devices based on tracking data availability, consistency of alerts delivery, and tracking data freshness associated with the designated set of users and the designated set of devices.

4. The method of claim 1, wherein evaluating real-time data targeting quality rating comprises generating at least one of targeting quality ratings of the designated set of users and the designated set of devices based on current device status, recipient presence information, recipient location information, and data freshness associated with the designated set of users and the designated set of devices.

5. The method of claim 1, further comprising receiving a plurality of prediction weighting data for generating the prediction of the potential reach of the alert.

6. The method of claim 1, further comprising using the prediction of the potential reach of the alert to maximize the reach of the alert in alert preparation and configuration.

7. The method of claim 1, further comprising using the prediction of the potential reach of the alert to ensure maximum reach to all intended audience during at least one of alert creation and alert activation.

8. The method of claim 1, further comprising using the prediction of the potential reach of the alert to prioritize users and devices with high targeting quality measure over users and devices with low targeting quality measure during alert delivery.

9. The method of claim 1, further comprising periodically monitoring the contact data quality rating, the tracking data quality rating, and the real-time data targeting quality rating, and notifying appropriate personnel in response to a detected change in one or more quality ratings.

10. The method of claim 1, wherein generating a prediction of the potential reach of the alert comprises estimating whether the alert reaches at least one of the designated set of users via at least one of the designated set of devices.

11. The method of claim 1, wherein the designated set of devices can include personal communication devices, non-personal notification devices, or both.

12. A non-transitory computer-readable storage medium storing executable computer program instructions for predicting potential reach of a mass notification system, the computer program instructions comprising instructions for:
receiving audience data defining a targeted audience of an alert, the received audience data identifying at least one of a designated set of users and a designated set of devices;
evaluating at least one of contact data, tracking data, and real-time data targeting quality rating based on the received audience data and one or more external databases:
generating a prediction of the potential reach of the alert based on the evaluation; and
outputting the prediction of the potential reach of the alert.

13. The computer-readable storage medium of claim 12, wherein evaluating the contact data targeting quality rating comprises generating at least one of targeting quality ratings of the designated set of users and the designated set of devices based on data availability, data validity, and data update quality associated with the designated set of users and designated set of devices.

14. The computer-readable storage medium of claim 12, wherein evaluating tracking data targeting quality rating comprises generating at least one of targeting quality ratings of the designated set of users and the designated set of devices based on tracking data availability, consistency of alerts delivery, and tracking data freshness associated with the designated set of users and the designated set of devices.

15. The computer-readable storage medium of claim 12, wherein evaluating real-time data targeting quality rating comprises generating at least one of targeting quality ratings of the designated set of users and the designated set of devices based on current device status, recipient presence information, recipient location information, and data freshness associated with the designated set of users and the designated set of devices.

16. The computer-readable storage medium of claim 12, further comprising computer program instructions for receiving a plurality of prediction weighting data for generating the prediction of the potential reach of the alert.

17. The computer-readable storage medium of claim 12, further comprising computer program instructions for using the prediction of the potential reach of the alert to maximize the reach of the alert in alert preparation and configuration.

18. The computer-readable storage medium of claim 12, further comprising computer program instructions for using the prediction of the potential reach of the alert to ensure maximum reach to all intended audience during at least one of alert creation and alert activation.

19. The computer-readable storage medium of claim 12, further comprising computer program instructions for using the prediction of the potential reach of the alert to prioritize users and devices with high targeting quality measure over users and devices with low targeting quality measure during alert delivery.

20. The computer-readable storage medium of claim 12, further comprising computer program instructions for periodically monitoring the contact data quality rating, the tracking data quality rating, and the real-time data targeting quality rating, and notifying appropriate personnel in response to a detected change in one or more quality ratings.

21. The computer-readable storage medium of claim 12, wherein generating a prediction of the potential reach of the alert comprises estimating whether the alert reaches at least one of the designated set of users via at least one of the designated set of devices.

22. The computer-readable storage medium of claim 12, wherein the designated set of devices can include personal communication devices, non-personal notification devices, or both.

* * * * *